United States Patent [19]

Jung

[11] Patent Number: 5,701,368

[45] Date of Patent: Dec. 23, 1997

[54] APPARATUS FOR ENCODING AN IMAGE SIGNAL HAVING A STILL OBJECT

[75] Inventor: Hae-Mook Jung, Seoul, Rep. of Korea

[73] Assignee: Daewoo Electronics Co., Ltd., Seoul, Rep. of Korea

[21] Appl. No.: 509,260

[22] Filed: Jul. 31, 1995

[30] Foreign Application Priority Data

Mar. 20, 1995 [KR] Rep. of Korea .................. 95-5861

[51] Int. Cl.$^6$ .................. G06K 9/46; G06K 9/36
[52] U.S. Cl. .................. 382/239; 382/243; 382/234
[58] Field of Search .................. 382/232, 234, 382/235, 237, 239, 242, 243, 248, 250; 348/384, 390, 395, 397, 398, 400, 403, 404, 405, 408, 409, 415, 420, 422, 421, 423, 426, 399; 358/433, 432, 426, 261.3, 430

[56] References Cited

U.S. PATENT DOCUMENTS

| | | | |
|---|---|---|---|
| 4,555,802 | 11/1985 | Fedak et al. | 382/243 |
| 4,722,008 | 1/1988 | Ibaraki et al. | 358/456 |
| 5,101,280 | 3/1992 | Moronaga et al. | 358/433 |
| 5,400,075 | 3/1995 | Savatier | 348/384 |
| 5,506,916 | 4/1996 | Nishihara et al. | 282/232 |
| 5,510,841 | 4/1996 | Iwamura | 348/384 |

Primary Examiner—Leo Boudreau
Assistant Examiner—Wenpeng Chen
Attorney, Agent, or Firm—Anderson Kill & Olick, P.C.

[57] ABSTRACT

An apparatus for encoding a digital video signal of an image based on a still object-oriented coding technique wherein the image signal is divided into a number of blocks of an identical size and pixels lying outside of the object being masked with a zero value comprises a subblock formatter for subdividing each of the blocks into $4^N$ subblocks; $4^N$ encoders, each of said encoders for encoding each one of the $4^N$ subblocks to produce a block of encoded data, respectively; $4^N$ edge detectors, each of the edge detectors for detecting a sub-object edge in said each subblock to produce an edge detection signal and for determining a pattern of the detected edge to produce an edge pattern identification signal; an interleaving block for interleaving each of the scanned data from each of said encoder to produce a stream of scanned data; and a variable length coder for coding a stream of interleaved scanned data to produce a variable length coded signal.

9 Claims, 4 Drawing Sheets

APPARATUS FOR ENCODING AN IMAGE SIGNAL HAVING A STILL OBJECT

FIELD OF THE INVENTION

The present invention relates to an apparatus for encoding an image signal at a low bit-rate; and, more particularly, to an apparatus for encoding an image signal having a still object based on an object-oriented coding.

DESCRIPTION OF THE PRIOR ART

In a digitally televised system such as video-telephone, high definition television or teleconference system, a large amount of digital data is needed to define each video frame signal since each line in the video frame signal comprises a sequence of digital data referred to as "pixels". Since, however, the available frequency bandwidth of a conventional transmission channel is limited, in order to transmit the substantial amount of digital data therethrough, it is inevitable to compress or reduce the volume of data through the use of various data compression techniques, especially in such low bit-rate image signal encoding systems as video-telephone and teleconference systems.

One of such methods for encoding image signals for a low bit-rate encoding system is the so-called object-oriented analysis-synthesis coding technique (see Michael Hotter, "Object-Oriented Analysis-Synthesis Coding Based on Moving Two-Dimensional Objects", *Signal Processing: Image Communication*, 2, 409–428(1990)).

According to the object-oriented analysis-synthesis coding technique, an image signal, which has moving objects, is divided according to the objects; and three sets of parameters for defining motion, contour and pixel data of each object are processed through different encoding channels.

In case of processing image data or pixels lying within a "still object", a transform coding technique for reducing only the spatial redundancies contained in the image data is employed in the object-oriented analysis-synthesis coding technique. One of such transform coding techniques frequently used for image data compression is a block based DCT (discrete cosine transform) coding, which converts a block of digital image data, for example, a block of 8×8 pixels, into a set of transform coefficient data. This method is described in, e.g., Chen and Pratt, "Scene Adaptive Coder", *IEEE Transactions on Communications*, COM-32, No. 3, pp. 225–232 (March 1984).

In the block based DCT coding, pixels lying outside of the still object are normally padded or masked with zero values and then the object is divided into a plurality of blocks for DCT coding. In the course of dividing the block, some of the plurality of blocks may be composed mostly of zero-masked pixels, and include only a small portion of the object therein. Accordingly, the coding of such mostly zero-masked pixel blocks may deteriorate the overall coding efficiency.

SUMMARY OF THE INVENTION

It is, therefore, a primary object of the present invention to provide an apparatus for effectively encoding an image signal in a low bit rate image coding system employing an object-oriented coding technique.

It is another object of the invention to provide an apparatus for effectively encoding mostly zero-masked pixel blocks to reduce the amount of data to be coded.

In accordance with the invention, there is provided an apparatus for encoding a digital video signal of an image having a still object therein, wherein the image signal is divided into a number of pixel blocks of an identical size and pixels lying outside of the object are masked with a zero value, the apparatus comprising: a subblock formatter for subdividing each of the pixel blocks into $4^N$ subblocks; encoding means having $4^N$ encoders, each of said encoders for encoding each one of said $4^N$ subblocks to thereby produce a block of encoded data; edge detecting means having $4^N$ edge detectors, each of said edge detectors for detecting an edge in the subblock to produce an edge detection signal and for determining a pattern of the detected edge to produce an edge pattern identification signal, wherein the edge in the subblock is categorized into one of a plurality of edge patterns including a starboard slant edge, a larboard slant edge, a horizontal slant edge, a vertical slant edge and a plain picture without an edge; scanning means having $4^N$ scanners, each of the scanners connected to its corresponding encoder for adaptively scanning the block of encoded data in accordance with the edge identification signal to produce a series of scanned data; means for interleaving each of the scanned data from each of said scanners to produce a stream of interleaved scanned data; and a variable length coder for variable length coding the stream of interleaved scanned data to produce a variable length coded signal.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
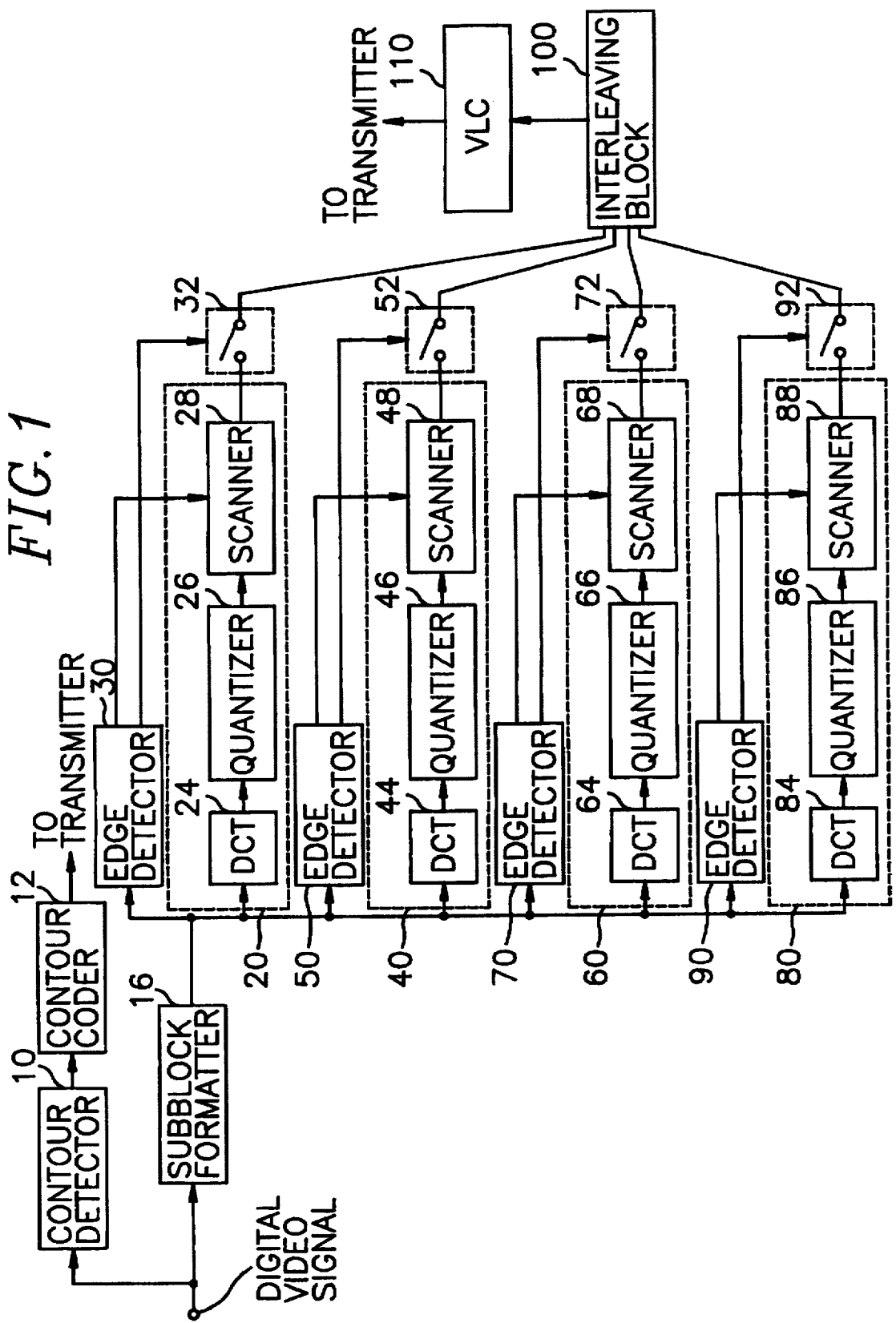
FIG. 1 shows a block diagram of an encoding apparatus in accordance with the invention.

Referring to FIG. 1, there is shown a block diagram of an apparatus for encoding an input video signal based on an object-oriented coding technique in accordance with the invention.

Figure 2A:
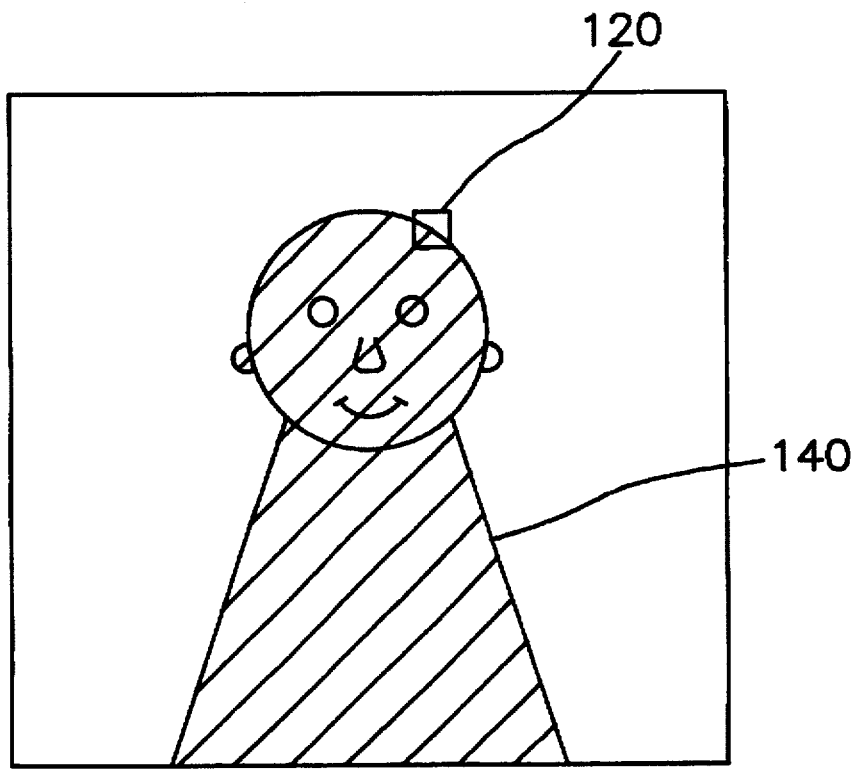
FIGS. 2A and 2B illustrate the formation of DCT blocks and subblocks, respectively.
Figure 2B:
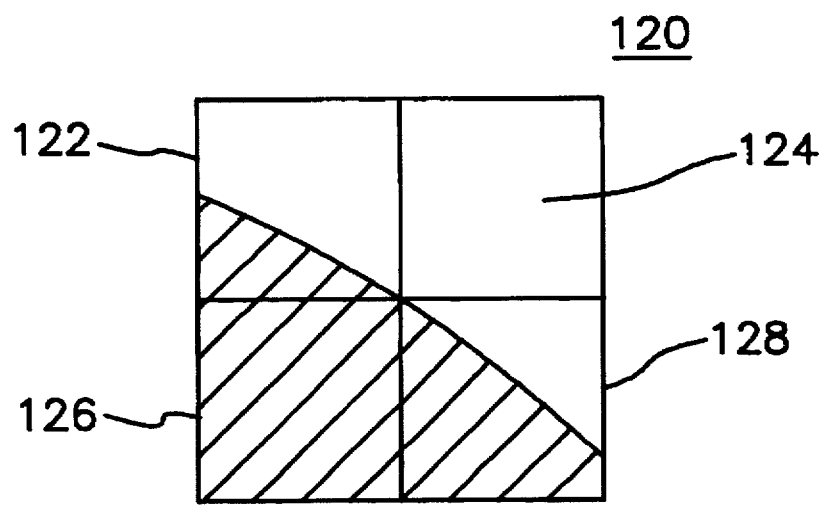
Figure 3A:
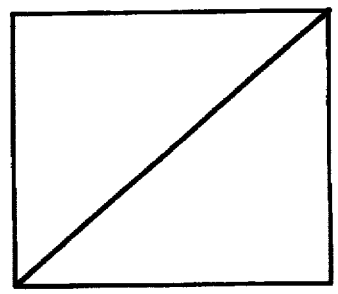
FIGS. 3 and 4 represent the relationship between an edge pattern of an object in a subblock and a scanning path for the subblock in accordance with the invention.
Figure 3B:
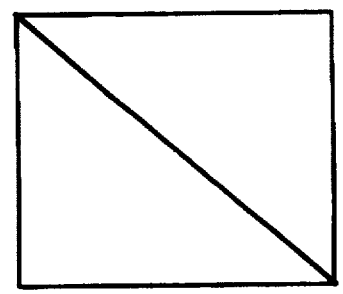
Figure 3C:
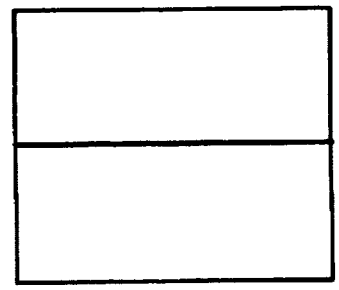
Figure 3D:
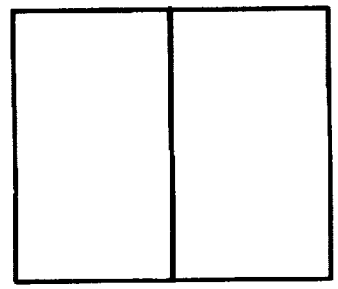
Figure 3E:
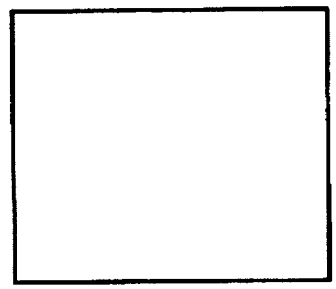

As illustrated in FIGS. 2A and 2B, the input video signal as used herein is defined as a digitized signal of a stationary image which has a still object 140 therein and which is divided into a number of equal-sized pixel blocks for DCT transform coding, e.g., 8×8 pixel blocks 120 wherein each of the pixels lying outside of the object 140 is masked with a zero value. The 8×8 pixel blocks are provided, one block at a time, to a contour detector 10 and a subblock formatter 16 of the inventive coding apparatus. In accordance with an embodiment of the invention, it is preferred to selectively provide a pixel block which has a mixture of zero-masked pixels and a small portion of the object therein rather than an entire block of non-zero pixels.

The contour detector 10 detects the contour of the object 140 in the image signal through the use of a conventional edge detection algorithm, e.g., a sobel operator or a gradient operator. As well known in the art, the contour or boundary of the object can be derived or defined from edge points, which are those pixel locations at which significant changes occur on a physical aspect of the image so that they can be used to identify the object in the image. Such a change is detected by comparing the magnitude of the luminance or grey levels of neighboring pixels with a predetermined threshold value. The contour information so detected is applied to a contour coder 12. The contour coder 12 codes the contour information of the object and provides the coded contour signal to a transmitter (not shown) for the transmission thereof through a transmission channel.

The subblock formatter 16 subdivides the 8×8 DCT block into a plurality of, e.g., $4^N$, pixel subblocks of an identical size where N is equal to 1 or 2. For the sake of illustrating a preferred embodiment of the invention, under the assumption that N is 1, FIG. 2B depicts the DCT block 120 which is subdivided into four subblocks 122, 124, 126 and 128 of 4×4 pixels wherein some of them, e.g., the subblocks 122, 126 and 128, are shown to include therein a sub-object which is marked in slanting lines. The subblocks 122, 124, 126 and 128 are provided to a set of edge detectors 30, 50, 70 and 90 and a set of encoding sections 20, 40, 60 and 80, respectively.

As can be seen from FIG. 1, the encoding sections 20, 40, 60 and 80 are composed of discrete cosine transformers (DCT) 24, 44, 64, 84, quantizers 26, 46, 66, 86 and scanners 28, 48, 68, 88, respectively. The subblocks 122, 124, 126 and 128 which are supplied to the encoding sections 20, 40, 60 and 80 are coupled to the discrete cosine transformers 24, 44, 64 and 84, respectively. At each of the discrete cosine transformers 24, 44, 64 and 84, each of the subblocks 122, 124, 126 and 128 of 4×4 pixel data is encoded into a block of transform coefficient data and then provided to each of the quantizers 26, 46, 66 and 86. Each of the blocks of transform coefficients is then quantized by each of the quantizers 26, 46, 66 and 86 into an array of quantized coefficients, respectively; and the array of quantized coefficients is subsequently fed to each of the scanners 28, 48, 68 and 88 for the scanning thereof, respectively.

In the meantime, each of the edge detectors 30, 50, 70 and 90 detects an edge of the sub-object in each subblock. The detection of the edge can be performed in a similar manner to that of the contour of the object as discussed above. When the subblock, e.g., a first, a third or a fourth subblock 122, 126 or 128, contains at least a non-zero pixel value therein, the edge detector 30, 70 or 90 regards the subblock as an edge block and generates an edge detection signal indicating the presence of the edge. Otherwise (e.g., in case of a second subblock 124), the edge detector 50 regards the subblock as a non-edge block. The edge detection signal is then fed to its corresponding switch circuits 32, 72 or 92, respectively, which, in response to the edge detection signal, selectively couples the scanned output from each of the scanners to the interleaving block 100. The edge detection signal may be transmitted to the transmitter to indicate that the subblock is an edge block or a non-edge block.

Further, each of the edge detectors 30, 50, 70 and 90 determines the pattern of the detected edge. Each of the edge detectors 30, 50, 70 and 90 is provided with the edge patterns including a starboard slant edge, a larboard slant edge, a horizontal slant edge, a vertical slant edge and a plain picture without an edge as shown in FIGS. 3A, 3B, 3C, 3D and 3E, respectively. Each of the edge subblocks is compared with each edge pattern to determine a most similar pattern. Accordingly, the detected edge in the subblock is categorized into one of the plurality of edge patterns. After the determination of the most similar edge pattern for a given edge subblock, each of the edge detectors 30, 50, 70 and 90 generates an edge pattern identification signal which is then provided to each of the scanners 28, 48, 68 and 88, respectively.

At each of the scanners 28, 48, 68 and 88, the array of quantized coefficients from its corresponding quantizer 26, 46, 66, 86 is adaptively scanned in accordance with the edge identification signal from each edge detector. The adaptive scanning depends on the edge pattern classified by the edge identification signal. That is to say, when the pixel data within the starboard and the larboard slant edge blocks and the plain picture block is coded through the use of the DCT coding technique, low frequency components tend to mainly distribute toward the upper left corner portions of their DCT coded blocks. And, the DCT coding for the horizontal and the vertical slant edge pixel blocks results in the concentration of low frequency components at the left and the upper portions of their DCT coded blocks, respectively.

Figure 4A:
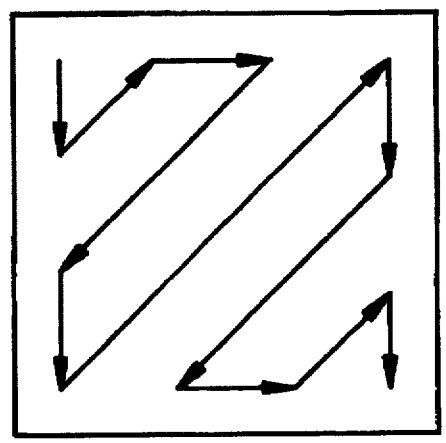
Figure 4B:
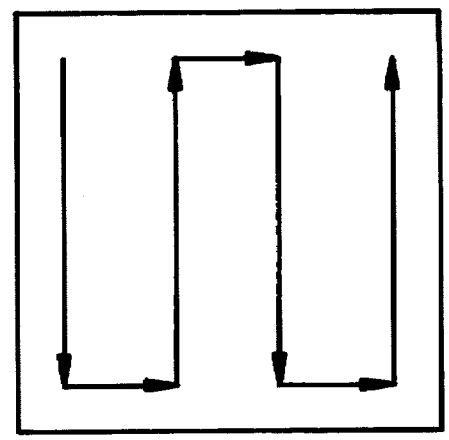
Figure 4C:
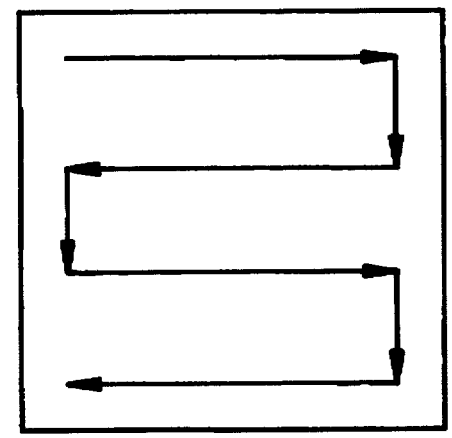

Referring now to FIG. 4 together with FIG. 3, there is represented the relationship between the edge pattern and the scanning path. As shown in FIGS. 3A and 3B, when the edge pattern is the starboard or the larboard slant edge as identified by the edge pattern identification signal, the array of quantized coefficients is scanned in accordance with an inclined zig-zag scanning path, as illustrated in FIG. 4A, which starts at the upper left most to eventually reach the bottom right most. As shown in FIGS. 3C and 3D, when the edge identification signal indicates the horizontal or the vertical slant edge, the quantized coefficients in the array are subjected to a horizontal or a vertical zig-zag scanning which runs in a horizontal or a vertical direction in a zig-zag fashion, respectively. However, in case where, as shown in FIG. 3E, particular pixel values, i.e., non-zero pixels occupy the entire subblock which corresponds to the subblock 126 in FIG. 2B and is indicated as the plain picture, the quantized transform coefficient array is subjected to an inclined zig-zag scanning as in the case of a starboard or larboard slant edge. Consequently, the scanners 28, 48, 68 and 88 produce first to fourth series of scanned quantized coefficients in a zig-zag manner, respectively.

The series of scanned quantized coefficients from the scanners 28, 48, 68 and 88 are provided to the interleaving block 100 through the switch circuits 32, 52, 72, and 92 which serve to selectively pass the scanned quantized coefficients to the interleaving block 100 in response to the edge detection signal from each of the edge detectors 30, 50, 70 and 90. In this connection, no scanned quantized coefficients of the second series from the scanner 48 may flow to the interleaving block 100 because an edge detection signal for the second subblock 124 is not provided to the switch circuit 52 from the edge detector 50.

The interleaving block 100 rearranges or interleaves the scanned quantized coefficients of the first to the fourth series to form a stream in such a manner that a first coefficient in the first series is followed by each first coefficient in the second to the fourth series and then a second coefficient in the first series is followed by each second coefficient in the second to the fourth series and so on. For instance, assuming that the quantized scanned coefficients of the first, the third and fourth series comprise A1, A2, A3, . . . , A16; B1, B2, B3, . . . , B16; and C1, C2, C3, . . . , C16 and the quantized scanned coefficients of the second series are absent, the sequence of the rearranged coefficient stream will be as follows: A1, B1, C1, A2, B2, C2, A3, B3, C3, . . . , A16, B16, C16. The stream of rearranged coefficients is provided to the variable length coder ("VLC") 110 which is basically of a look-up table and provided with a plurality of code sets to define a respective relationship between each set of a zero run-length and a level of the quantized coefficients and its variable length code. Accordingly, in the VLC, the quantized rearranged coefficients together with the edge detection signal are converted into a set of variable length coded data. The variable coded data is transmitted through the conventional transmission channel.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for encoding a digital video signal of an image having a still object therein, wherein the image signal is divided into a number of pixel blocks of an identical size and pixels lying outside of the object are masked with a zero value, the apparatus comprising:

a subblock formatter for subdividing each of the blocks into $4^N$ subblocks, wherein N is 1 or 2;

encoding means having $4^N$ encoders, each of said encoders for encoding each one of said $4^N$ subblocks to thereby produce a block of encoded data;

edge detecting means having $4^N$ edge detectors, each of said edge detectors for detecting an edge in the subblock to produce an edge detection signal and for determining a pattern of the detected edge to produce an edge pattern identification signal, wherein the edge in the subblock is categorized into one of a plurality of edge patterns including a starboard slant edge, a larboard slant edge, a horizontal slant edge, a vertical slant edge and a plain picture without an edge;

scanning means having $4^N$ scanners, each of the scanners connected to its corresponding encoder for adaptively scanning each block of encoded data in accordance with the edge identification signal to produce a series of scanned data;

means for interleaving each of the scanned data from each of said scanners to produce a stream of interleaved data; and a variable length coder for coding a stream of interleaved data to produce a variable length coded signal.

2. The apparatus as recited in claim 1, wherein said each of the scanners performs on the encoded data an inclined zig-zag scanning if an edge pattern determined by the edge identification signal is one of the starboard slant edge, the larboard slant edge and the plain picture, a horizontal zig-zag scanning if the edge pattern is the horizontal slant edge, and a vertical zig-zag scanning if the edge pattern is the vertical slant edge.

3. The apparatus as recited in claim 2, further comprising switching means connected between each of the scanners and the interleaving means for selectively providing the scanned data from said each of the scanners to the interleaving means in response to the edge detection signal.

4. An apparatus for encoding a digital video signal of an image having an object therein, wherein the image is divided into a number of pixel blocks of an identical size, the apparatus comprising:

a subblock formatter for dividing each of the pixel blocks into M subblocks, wherein M is a positive integer greater than 1;

encoding means for encoding the M subblocks to thereby produce a block of encoded data for each of the subblocks;

edge detecting means for detecting an edge in each of the subblocks to produce an edge detection signal and for determining an edge pattern of the detected edge to generate an edge pattern identification signal identifying the determined edge pattern, wherein the edge is categorized into one of a plurality of edge patterns including a starboard slant edge, a larboard slant edge, a horizontal slant edge, a vertical slant edge and a plain picture without an edge;

scanning means for adaptively scanning each block of encoded data in accordance with the edge identification signal to produce a set of scanned data for each subblock;

means for interleaving sets of scanned data for each of the pixel blocks to produce a stream of interleaved data; and a variable length coder for coding the stream of interleaved data to produce a variable length coded signal.

5. The apparatus as recited in claim 4, wherein each pixel lying outside the object in the image is masked with a zero value.

6. The apparatus as recited in claim 4, wherein said scanning means performs on each block of encoded data an inclined zig-zag scanning if the edge pattern identified by the edge identification signal is one of the starboard slant edge, the larboard slant edge and the plain picture, a horizontal zig-zag scanning if the edge pattern is the horizontal slant edge, and a vertical zig-zag scanning if the edge pattern is the vertical slant edge.

7. The apparatus as recited in claim 4 further comprising switching means connected between the scanning means and the interleaving means for selectively providing the set of scanned data to the interleaving means in response to the edge detection signal.

8. The apparatus as recited in claim 4, wherein each pixel block includes 8×8 pixels.

9. The apparatus as recited in claim 8, wherein M is 4.

* * * * *